United States Patent [19]

Stamm et al.

[11] 4,238,878
[45] Dec. 16, 1980

[54] METHOD AND APPARATUS FOR FORMING SHROUD

[75] Inventors: Robert H. Stamm, Canton; Fred E. Krause, Detroit, both of Mich.

[73] Assignee: Brooks & Perkins, Incorporated, Southfield, Mich.

[21] Appl. No.: 18,263

[22] Filed: Mar. 9, 1979

[51] Int. Cl.³ .................. B21D 26/02; B21D 39/04; B23P 11/02; B23P 19/00
[52] U.S. Cl. ............... 29/421 R; 29/DIG. 44; 29/517; 29/523; 29/723; 29/788; 72/60; 72/370; 72/DIG. 8
[58] Field of Search ............ 29/DIG. 44, 421 R, 469, 29/522 R, 523, 723, 788, 789, 790, 517; 72/DIG. 8, 38, 60, 370; 176/30, 87; 250/506, 507, 518

[56] References Cited

U.S. PATENT DOCUMENTS

| | | | |
|---|---|---|---|
| 167,688 | 9/1875 | Puffer | 29/421 R |
| 1,378,442 | 5/1921 | Chalfant | 29/421 R |
| 1,834,128 | 12/1931 | Langenberg | 72/60 |
| 2,783,819 | 3/1957 | Duff | 29/DIG. 44 |
| 3,015,599 | 1/1962 | Roberts et al. | 29/DIG. 44 |
| 3,670,555 | 6/1972 | Fredericks | 72/370 |
| 3,736,846 | 6/1973 | Frankenberg | 72/370 |
| 3,801,087 | 4/1974 | Akaike et al. | 29/517 UX |
| 4,006,362 | 2/1977 | Mollon et al. | 250/518 |
| 4,072,041 | 2/1978 | Hoffmann et al. | 29/517 |

FOREIGN PATENT DOCUMENTS

1450279  7/1966  France ................. 72/370

*Primary Examiner*—Ervin M. Combs
*Attorney, Agent, or Firm*—Whittemore, Hulbert & Belknap

[57] ABSTRACT

A method and apparatus for assembling together a rectangular outer tube, a rectangular inner tube and thin flat elongated panels having their side surfaces solidly abutted between the inner wall of the outer tube and the outer wall of the inner tube. The assembly is expanded by applying an internal pressure of at least a thousand psi into contact with a die cavity of rectangular cross-section. In order to minimize the required expansion of the tubes it is desirable that the inner tube conform as closely as possible to the space between the panels prior to expansion. In order to facilitate insertion of the panels, the inner tube is subjected to a controlled collapse in which its sidewalls are curved inwardly and its corners are displaced radially inwardly to provide additional clearance for insertion of the panels. After insertion of the panels the walls of the inner tube are formed outwardly to fit relatively closely within the space defined by the panels. Finally, the entire assembly is expanded within a die cavity of rectangular cross-section.

15 Claims, 10 Drawing Figures

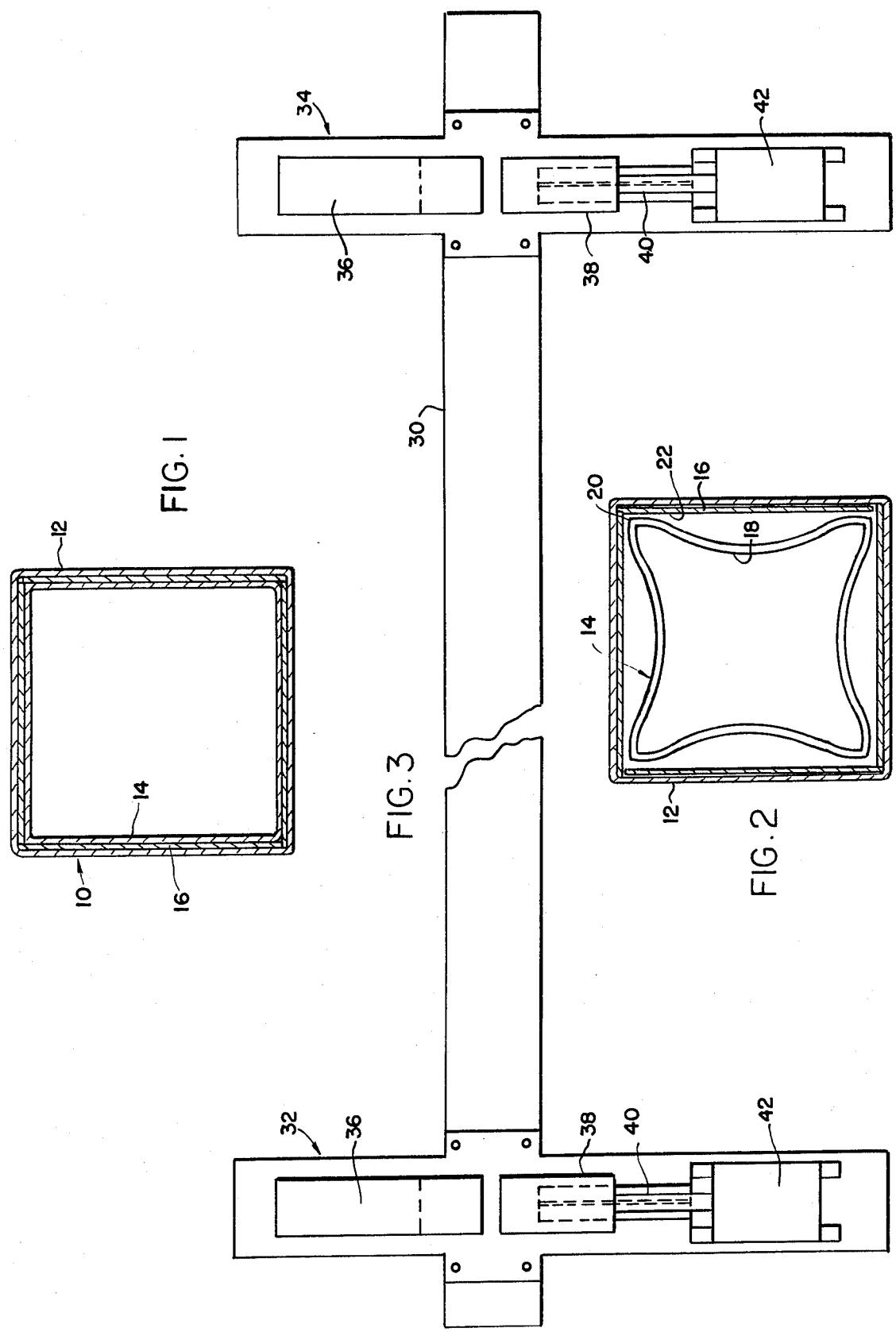

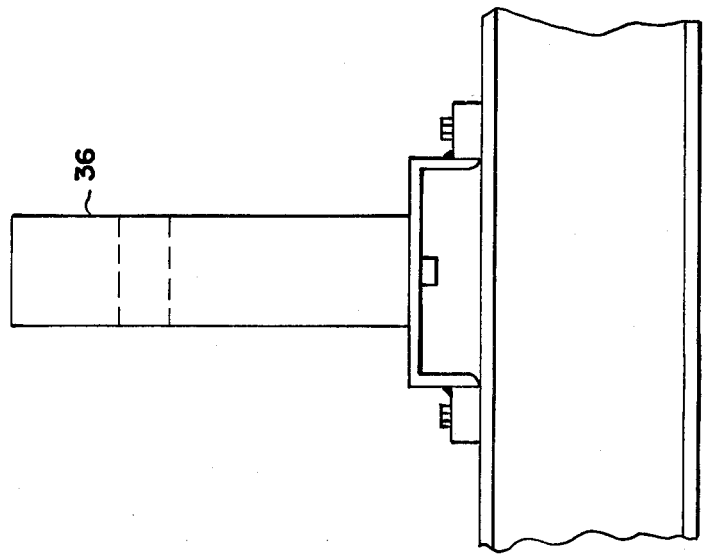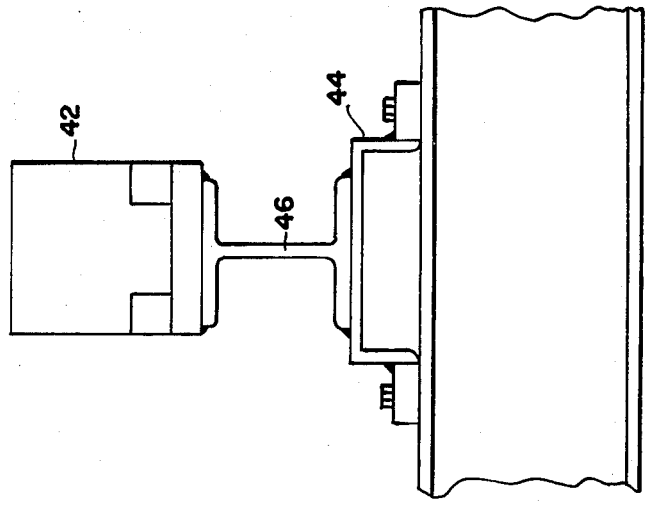

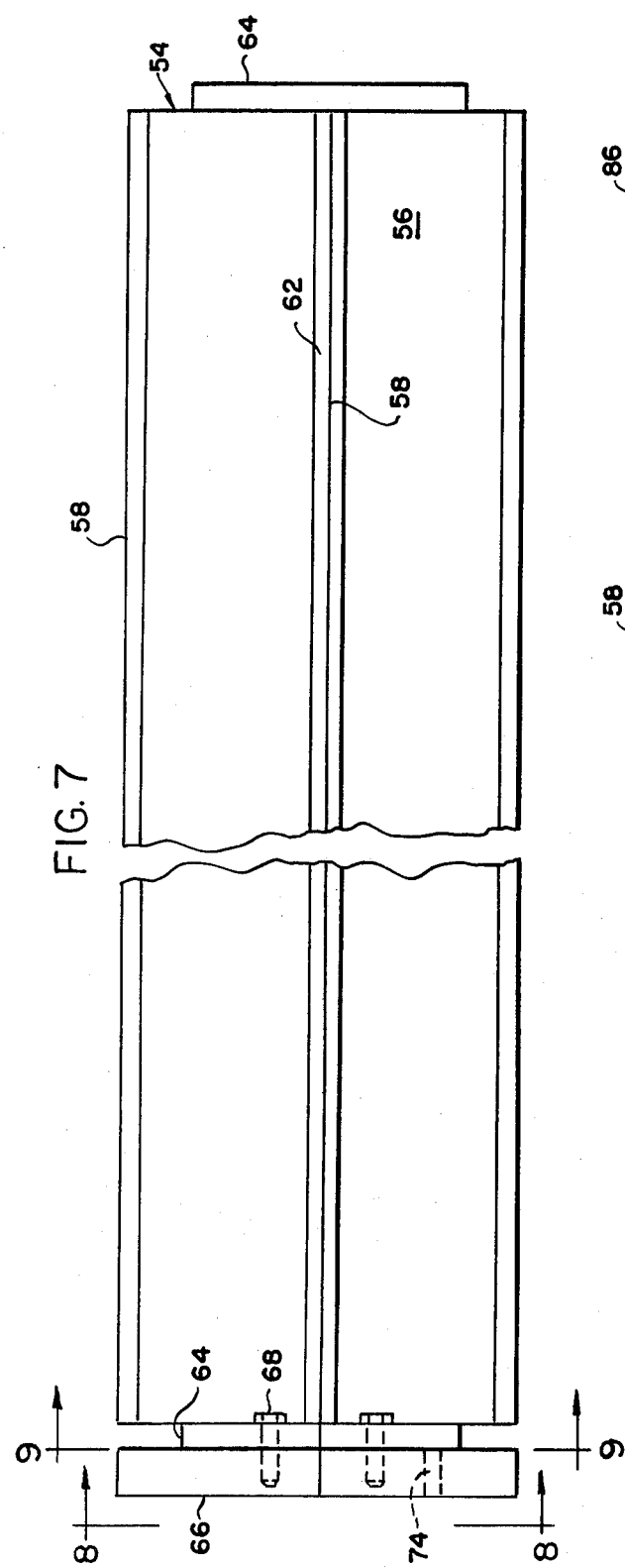

METHOD AND APPARATUS FOR FORMING SHROUD

BRIEF SUMMARY OF THE INVENTION

The present invention relates to the manufacture of a shroud for storing radioactive spent nuclear fuel cells. Shrouds of this type are disclosed in Mollon, et al U.S. Pat. No. 4,006,362.

Briefly described, the shrouds comprise elongated tubular structures of square cross-section comprising inner and outer aluminum tubes and flat thin panels of neutron absorbing material having their side surfaces solidly abutted between the inner surface of the outer tube and outer surface of the inner tube. As disclosed in the prior patent, the panels are preferably formed of a core of an aluminum and boron carbide mixture disposed between thin aluminum sheets.

The method of producing the finished shroud includes the steps of inserting the inner tube in the outer tube and inserting the four panels into the space between the confronting sidewalls of the tubes.

Inasmuch as the final operation includes expansion of the inner tube to establish pressure contact through the panels with the sidewalls of the outer tubes and thereafter to expand the outer tube in conformity with the die cavity, it is essential that the dimensions of the tubes and panels prior to expansion are such as to minimize the actual expansion or stretching of the tubes under the pressure which conforms them to the die cavity. However, if these dimensions are such that the space between the outer surfaces of the inner tube and the inner surfaces of the outer tube are only slightly greater than the thickness of the panels, difficulty is encountered in inserting the panels as the final step in completing the preliminary assembly.

In accordance with the present invention, the inner rectangular tube is initially formed with the outer surfaces of its opposite sidewalls spaced apart a distance only slightly less than the spacing between the opposing inner surfaces of the sidewalls of the outer tube, as for example only a few thousandths of an inch. With these dimensions it becomes extremely difficult if not practically impossible to insert the long, thin, flat panels into the tube assembly.

In accordance with the present invention the rectangular inner tube is subjected to a controlled collapse in which its sidewalls are bowed or curved inwardly uniformly by a predetermined amount and in consequence its corners are displaced radially inwardly. This is accomplished by supporting the rectangular inner tube on a support mandrel including four rigid elongated tube corner support members. The tube corner members terminate at their outer edges with tube engaging surfaces including relatively sharp corners engageable only at the extreme inner corners of the inner tubes upon collapse of the tube. Portions of the tube corner support members inwardly of the outer corners occupy a space defined between planes having an included angle of less than 90°. The opposite tube corner surfaces of the mandrel are spaced apart a distance slightly less than the initial diagonal spacing between inner corner surfaces of the inner tube while in its square shape to limit the inward displacement of the corners of the inner tube and accordingly the inward curvature permitted for the sidewalls of the inner tube.

The open ends of the inner tube are closed by end caps with sealing faces pressed against the end of the tube, or by insertion therein of plugs having a shape conforming substantially to the shape acquired by the inner tube as a result of the controlled collapse thereof. The ends of the tube are mechanically displaced inwardly against the plugs to provide an effective substantially airtight seal. One of the plugs is provided with a port through which the interior of the tube is connected to a source of vacuum. Upon evacuation of the tube, atmospheric pressure of the tube causes inward collapse of the tube and this in turn causes inward displacement of the corners of the tube by an amount determined by the diagonal spacing between the tube corner engaging surfaces of the mandrel.

The plugs are removed from the collapsed tube and the tube is removed from the mandrel and placed within the outer rectangular tube. As a result of the controlled collapse of the inner tube, adequate clearance is provided for ready insertion of the panels after which the tube and panel assembly is subjected to internal pressure.

Thereafter the assembly of tubes and panels is placed in a die cavity of square cross-section. At this time an internal pressure is applied, as by means of flexible hydraulic conductors, to subject the inner wall of the assembly to pressure in excess of 1,000 psi. This expands the inner tube to apply pressure through the panels to the outer tube to in turn expand the outer tube in conformity with the rectangular cavity in the die. As a result of the relatively massive pressure, the shroud becomes a solidly integrated unit capable of outstanding subsequent handling as required to perform its function of storing spent nuclear fuel.

BRIEF DESCRIPTION OF THE DRAWINGS

FIG. 1 is a cross-sectional view of a shroud as produced in accordance with the present invention.

FIG. 2 is a cross-sectional view of the shroud with the collapsed tube and panels therein.

FIG. 3 is a plan view of the apparatus for producing controlled collapse of the inner tube.

FIG. 5 is a fragmentary elevational view looking in the direction of the arrows 5—5, FIG. 4.

FIG. 6 is a view similar to FIG. 5 looking in the direction of the arrows 6—6, FIG. 4.

FIG. 7 is an enlarged plan view of the tube supporting mandrel.

FIG. 8 is an end view looking in the direction of the arrows 8—8, FIG. 7.

FIG. 9 is a sectional view on the line 9—9, FIG. 7.

FIG. 10 is an end view of a mandrel of somewhat different configuration.

DETAILED DESCRIPTION

Figure 4:
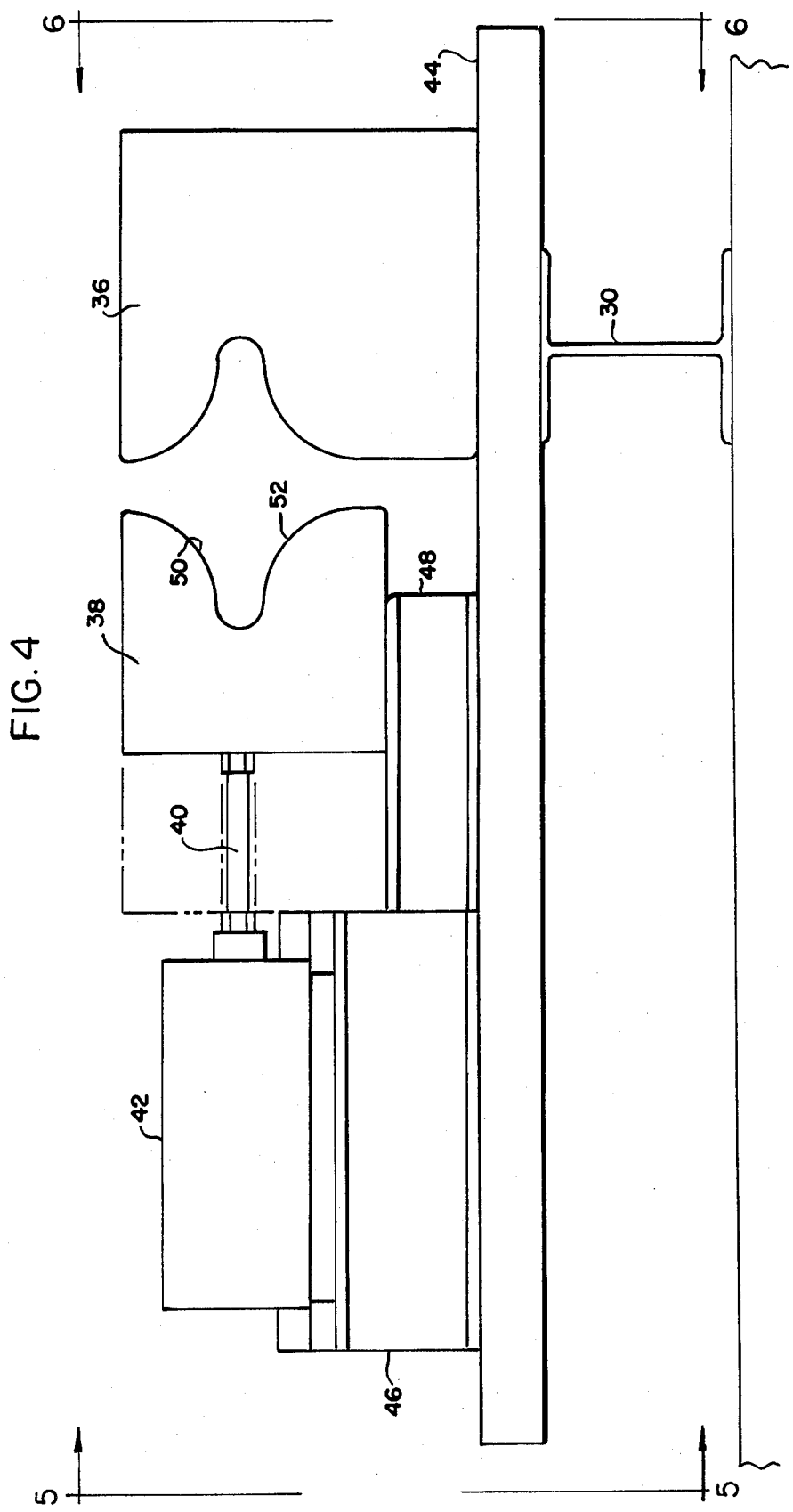
FIG. 4 is an end elevation of the structure shown in FIG. 3, to an enlarged scale.

In FIG. 1 there is shown in cross-section a shroud 10 comprising an outer elongated metal tube 12 of rectangular, preferably square, cross-section, an inner elongated metal tube 14 of similar cross-section and four flat thin panels 16 having their side surfaces solidly abutted between the confronting walls of the inner and outer tubes. Preferably the inner and outer tubes are formed of metal, such as stainless steel or aluminum having a wall thickness of less than 0.030 inches as for example 0.018 inches and in practice the inner tube is preferably somewhat thinner than the outer tube. The panels 16 are aluminum-boron carbide sandwiches in which a core of a solidly bonded uniform mixture of boron carbide and aluminum particles is encased between thin aluminum sheets. The panels have a thickness of approximately 0.135 inches. The assembly as illustrated in FIG. 1 is completed by applying an internal pressure in excess of 1,000 psi to expand the shroud into conformity with a die cavity of square cross-section.

In order to assemble the components of the shroud for final expansion by the application of internal pressure, obviously adequate clearance must be provided for the insertion of the relatively thin neutron absorbing panels. In a typical example the length of the shroud may be approximately 15 feet and its cross-section width dimensions approximately six or nine inches. From the dimensions it will of course be apparent that insertion of the panels may be difficult unless substantial clearance is provided between confronting tube walls.

In accordance with the present invention the inner tube is initially formed of square cross-section having an outside width less than the inside width of the outer tube by only a few thousandths of an inch plus more than twice the thickness of the panels. This is desirable to avoid difficulties encountered if the required expansion of the inner tube is excessive. On the other hand if the dimensions are such as to provide the required minimum clearance, insertion of the long thin relatively wide panels becomes difficult or impossible.

In order to overcome these defects it has been found that the inner tube may be given dimensions such that its initial transverse dimension is less than the transverse inner dimension of the outer tube by an amount only slightly greater than twice the thickness of the panels. Thereafter the inner tube is subjected to a controlled collapse in which its sidewalls are bowed or curved inwardly and as a consequence its corners are displaced radially inwardly. This results in a preliminary assembly as shown in FIG. 2 in which the inner tube 14 has its sidewalls 18 curved or bowed inwardly as illustrated and its corners 20 displaced inwardly from the corners defined by the intersection between the inner surfaces 22 of the panels 16 as illustrated. It will be apparent from an inspection of FIG. 2 that insertion of the panels 16 into the clearance provided between the inner tube 14 and the outer tube 12 presents no difficulties.

After the assembly as illustrated in FIG. 2 is completed, pressure is applied to the space within the inner tube 14 which will cause it to resume its rectangular cross-sectional shape so that its outer surfaces are at least closely contiguous to the inner surfaces of the panels 16.

Referring now to FIGS. 3 through 9 the apparatus for bringing about the controlled collapse of the tube is illustrated. This apparatus comprises an elongated frame 30 here illustrated as an I-beam having a length somewhat greater than the length of the shroud tubes to be manufactured. Adjacent the opposite ends of the frame 30 are stations 32 and 34, each provided with forming members comprising a stationary clamp 36 and a movable clamp 38 mounted for movement toward and away from stationary clamp 36. The movable clamps 38 are each connected by a piston rod 40 to a piston movable within a fluid cylinder 42.

Referring more specifically to FIGS. 4–6, one of the stations 32 or 34 is illustrated in enlarged detail. Here it will be observed that the structure is mounted on an inverted channel 44 to which the stationary clamp 36 is rigidly attached as for example by welding. The fluid cylinder 42 is mounted on a short I-beam 46 and the connection of the piston rod 40 to the movable clamp 38 is illustrated. It will be observed that the clamp 38 is movable on a short I-beam 48 secured to the panel 44.

It will be further observed that the clamps 36 and 38 have confronting tube engaging configurations including recesses 50 having convex wall portions 52 shaped to interfit with a tube end when collapsed to its predetermined configuration.

Associated with the apparatus so far described there is provided an elongated mandrel 54 having a length only slightly less than the length of the inner tube to be collapsed. The mandrel 54 as best seen in FIGS. 7 through 9 has a cross-sectional shape which may be considered as a cross including four radially extending rigid arms 56 terminating in substantially sharp corner engaging surfaces 58. The structure may be produced by bonding together four angle irons, each of which is indicated generally at 60, so that each radially extending arm 56 of the mandrel is formed by two legs of adjacent angle irons 60. The surface 62 of the tube corner support portions adjacent the corner 58 have an included angle of less than 90° to permit portions of the tube adjacent the corner to collapse inwardly, as suggested by the tube 14 shown in collapsed condition in FIG. 2.

At opposite ends the mandrel 50 includes rectangular plates 64 welded or otherwise secured to the end surfaces of the angle irons. To one of these plates, as for example illustrated to the left in FIG. 7, there is attached a plug 66, as by assembly screws 68. The plug 66 has a configuration conforming generally to the desired collapsed shape of the tube as will be observed by comparing FIG. 2 and FIG. 8. The plug 66 includes a rigid portion 70 provided around its periphery with a flexible sealing strip 72 which may be of rubber or the like. One plug 66 as indicated may be permanently attached to one end of the mandrel. A second plug of substantially identical configuration is provided as a separate detachable piece adapted to be inserted in and removed from a tube before and after the operation of controlled collapse.

The plug 66 which is permanently mounted on the mandrel is provided with a port 74 for connection to a source of vacuum (not shown) for a purpose which will be presently described.

The apparatus is used to produce a controlled collapse of the inner tube 14 to the approximate configuration illustrated in FIG. 2. The mandrel 54 is placed in the inner tube 14 which at this time has its original square cross-section and the assembly is placed on the apparatus illustrated in FIG. 3 with a diagonal dimension of the square tube disposed vertically. At this time the plug 66 which is permanently attached to the mandrel 54 is received in an extreme end portion of the tube with the outer surface of the plug 66 and the end of the tube substantially occupying the same plane. The free or unattached plug 66 is now inserted in the other open end of the tube. The tube with the mandrel and plugs therein is located with respect to the clamps 36 and 38 such that one set of clamps is in the same plane as a plug. At this time the cylinders 42 are supplied with fluid under pressure and the movable clamps 38 are moved against the tube ends. This collapses the material of the tube ends into substantial sealing engagement with the yieldable sealing mandrel 32 provided around the periphery of each plug. Accordingly the interior of the tube, which is at this time collapsed only at its ends, is effectively sealed.

The interior of the sealed tube is now connected to a source of vacuum (not shown) through the port 74 and the interior of the tube is evacuated. Since the material of the inner tube 14 is relatively thin as for example approximately less than 0.030 inches and is preferably of stainless steel sheet material, atmospheric pressure over the relatively large area of each side of the tube will cause it to collapse inwardly. This inward collapse of the sidewalls of the tube produces an inward transverse curvature which in turn causes a radially inward displacement of the corners of the tube. The amount of collapse is of course determined by the spacing between the corner engaging surfaces 58 of the mandrel.

If the evacuation of the tube does not produce sufficient pressure differential to cause the collapse of the tube sidewalls, this collapse may be initiated by applying light pressure to elongated external areas of the sidewalls.

It will be appreciated that the precise shape of the inward curvature of the wall is not important, since its purpose is only to provide adequate clearance to facilitate insertion of the thin flat panels 16.

Following collapse of the tube 14 to the approximate configuration illustrated in FIG. 2, the tube is inserted in the outer square tube 12 and the panels 16 are inserted in such a way as to produce overlap at the edges of the panel in order to prevent escape of neutrons between edges of adjacent panels.

Thereafter the assembly, substantially in the condition illustrated in FIG. 2, or alternatively with the inner tube restored substantially to its initial square cross-section, is placed within a die having an elongated die cavity of square cross-section conforming closely to the dimensions of the outer tube 12. Relatively massive internal pressure is thereafter applied to the assembly, as suggested in the above identified prior U.S. Pat. No. 4,006,362. For example the pressure may conveniently be applied through flexible hydraulic bags in a known operation. The pressure is sufficient to restore the inner tube 14 to square cross-section if necessary, and thereafter to actually expand the inner tube as required to produce further solid contact with the inner surfaces 22 of the panels. The continued application of pressure is then effective to produce further expansion of the inner tube to in turn produce an actual expansion of the outer tube 12 to conform to the die cavity. This of course results in providing solid intimate pressure contact between confronting surfaces of the panels and tubes and produces an essentially unitary shroud capable of withstanding the handling necessary to provide for its placement and removal in the pool structure provided for storing radioactive nuclear fuel cells.

Referring now to FIG. 10 there is illustrated at 80 a somewhat different embodiment of mandrel. In this case the mandrel comprises essentially an elongated rigid tube 82 along which are provided radially extending strips 84 terminating in sharp corner engaging surfaces 86. Strips 84 terminating in sharp corner engaging surfaces 86. Strips 84 may conveniently be welded or bonded to the tube and both the tube and strips may be formed of aluminum.

In both forms of mandrel it will be observed that the four corner supporting surfaces 86 are disposed circumferentially at 90° intervals and the circumferential space between corner supporting elements is free and clear to permit substantial inward bowing or curvature of the sidewalls as previously described.

What is claimed is:

1. The method of producing controlled collapse of an elongated thin sheet metal tube of square cross-section having four initially flat sides, a length up to about fifteen feet and sides approximately six to nine inches in width, which comprises placing the tube on an elongated mandrel having four elongated rigid tube corner support portions with peripherally adjacent support portions separated to provide clear spaces into which side walls of the tube may be displaced, in which the dimension between diametrically opposite tube engaging surfaces of the corner support portions is slightly less than the internal dimension between opposite corners of the tube, sealing the ends of the tube, and evacuating the interior of the tube, to produce a controlled collapse of the tube in which its corners collapse radially inwardly to engage the radially outer tube engaging surfaces of the corner support portions and its initially flat sides are collapsed inwardly by atmospheric pressure to assume an inward curvature controlled by the separation between the tube engaging surfaces of the tube supports.

2. The method as defined in claim 1 in which sealing the ends of the tube comprises applying plates having sealing faces against the open ends of the tube.

3. The method as defined in claim 1 in which sealing the ends of the tube comprises placing sealing plugs in the open ends of the tube having a shape closely approximating the cross-sectional shape of the tube after collapse thereof, and mechanically pressing the ends of the tube into sealing engagement with the plugs.

4. Apparatus for effecting the controlled collapse of an elongated tube several feet in length and formed of sheet metal having a thickness of less than 0.030 inches and initially flat sides and of square cross-section approximately six to nine inches on a side to a collapsed shape of uniform cross-section from end to end having slightly inwardly concave sides and opposite corners spaced apart a distance slightly less than the initial spacing between such opposite corners, said apparatus comprising:

an elongated rigid mandrel of a length slightly less than the length of the tube, said mandrel having four straight rigid corner support portions spaced to conform to the spacing of the corners of the collapsed tube and adapted to be received in a tube in its initially square cross-sectional shape with the corner support portions in a clearance condition with respect to the corners of the tube, and with both end portions of the tube free, said mandrel having free clearance spaces between adjacent corner support portions to provide for free inward collapse of the sides of the tube as controlled only by engagement between the tube corners and the corner support portions of the mandrel, a pair of four sided sealing plugs dimensioned to be received in the open ends of the tube in its initial square cross-sectional shape and having concave sides conforming to the required cross-sectional shape of the collapsed tube, an elongated frame having a pair of forming members at each end, the forming members of each pair being concavely shaped to provide two forming surfaces, each of which is slightly convex to substantially conform to one side of the tube in its required collapsed shape, means on said frame mounting said forming members of each pair for relative movement toward and away from each other and means for moving the members of each pair toward each other to mechanically collapse the end portions of the tube onto said plug in sealing relation, and a fluid fitting providing a passage through one of said plugs for connection to source of suction to evacuate the tube interior to provide controlled collapse of the initially square cross-section flat sided tube onto the corner support portions of said mandrel.

5. Apparatus as defined in claim 4 in which one of said plugs is secured to one end of said mandrel.

6. Apparatus as defined in claim 4, in which said forming members are positioned on said frame with the two forming surfaces of each member one above the other, whereby said forming members support the tube prior to collapse with one corner uppermost.

7. Apparatus as defined in claim 4, in which said mandrels are formed of four angle bars welded together with the longitudinal central corners thereof substantially adjacent to each other, flanges of each adjacent pair of angle bars abutting to constitute one of said rigid corner support portions.

8. Apparatus as defined in claim 4, in which said mandrel comprises a central rigid metal tube, and said rigid corner support portions comprise rigid metal strips having their inner edges welded to said rigid tube and with outer edges shaped to engage within the corners of a square metal tube placed thereover.

9. Apparatus as defined in claim 4, in which the rigid corner support portions comprise outer edges defined by the intersection of surface portions having an included angle of less than 90° to leave the entire side walls of the rectangular tube free.

10. Apparatus as defined in claim 4, in which one of said plugs is fixed to one end of said mandrel in slightly spaced relation to the adjacent ends of the tube corner support portions, the passage through said plug providing for connection to a source of vacuum whereby the spacing between the said one plug and the ends of said tube corner support portions effectively connects the source of vacuum to all spaces enclosed by tube side walls.

11. The method of making a tubular shroud of uniform square cross-section from end to end for receiving spent nuclear fuel cells, said shroud comprising an elongated thin sheet metal tube of square cross-section, an inner elongated thin sheet metal tube of corresponding square cross-section, said tubes being up to about fifteen feet in length and about six to nine inches across, and separate elongated flat thin panels of neutron absorbing material abutted between corresponding sides of the inner and outer tubes and extending for the full length of the shroud, which comprises: initially forming the inner tube to square cross-section with its outside transverse dimensions smaller than the inner transverse dimensions of the outer tube by approximately twice the thickness of a panel, providing an elongated rigid mandrel having four longitudinally extending rigid tube corner support portions with adjacent corner support portions separated to provide clear spaces therebetween into which the side walls of the inner tube are freely displaceable, and with opposite corner support portions separated by a diagonal dimension slightly less than the internal diagonal dimension of the inner tube, positioning the inner tube on the mandrel with its longitudinal corners adjacent the corner support portions of the mandrel, sealing the ends of the inner tube, evacuating the interior of the inner tube to cause atmospheric pressure to cause inward collapse of the inner tube limited by engagement between the tube corners and the corner support portions of the mandrel to bend the side walls of the inner tube inwardly and to move opposite longitudinal corners of the inner tube diagonally inwardly into contact with the longitudinal corner support portions of the mandrel, breaking the seal of the ends of the inner tube, removing the inner tube from the mandrel, inserting the collapsed inner tube and the thin flat elongated panels into the outer tube with the clearance therebetween resulting from the controlled collapse of the inner tube and applying fluid pressure to the interior of the inner tube while positioning the tube assembly within a die of square cross-section to expand the inner tube to engage the side surfaces of the panels between the inner surface of the outer tube and the outer surface of the inner tube, and to expand the outer tube to conform to the die.

12. The method as defined in claim 1, in which the tubes are of stainless steel and have a thickness of less than approximately 0.030".

13. The method as defined in claim 11, which comprises applying the internal pressure to the inner tube in an amount of several thousand psi.

14. The method as defined in claim 11, in which the mandrel is slightly shorter than the inner tube, which comprises positioning the inner tube on the mandrel with open end portions of the tube extending slightly beyond the ends of the corner support portions of the mandrel, and which comprises sealing the open ends of the inner tube by positioning in the open ends thereof plugs having a cross-sectional shape approximating the cross-sectional shape of the inner tube after controlled collapse thereof, and mechanically pressing the ends of the inner tube into sealed engagement with the plugs.

15. The method as defined in claim 14, in which the plugs have compressible sealing material disposed about their peripheries to sealing engage the inner end surfaces of the inner tube.

* * * * *